US011015517B2

(12) United States Patent
Zatko et al.

(10) Patent No.: US 11,015,517 B2
(45) Date of Patent: *May 25, 2021

(54) ROTARY AXIAL VALVE

(71) Applicant: Garrett Transportation I Inc., Torrance, CA (US)

(72) Inventors: Miroslav Zatko, Brno (CZ); Jaroslav Krejci, Pribyslav (CZ); Jakub Planka, Zlin (CZ); Jan Klement, Brno (CZ)

(73) Assignee: GARRETT TRANSOPORTATION I INC, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,906

(22) Filed: Apr. 14, 2020

(65) Prior Publication Data

US 2020/0240323 A1     Jul. 30, 2020

Related U.S. Application Data

(63) Continuation of application No. 15/889,642, filed on Feb. 6, 2018, now Pat. No. 10,655,534.

(51) Int. Cl.
| F02B 37/18 | (2006.01) |
| F02M 26/70 | (2016.01) |
| F02M 26/05 | (2016.01) |
| F01N 3/10 | (2006.01) |
| F02B 37/22 | (2006.01) |

(Continued)

(52) U.S. Cl.
CPC ............ *F02B 37/183* (2013.01); *F02B 37/22* (2013.01); *F02M 26/05* (2016.02); *F02M 26/43* (2016.02); *F02M 26/52* (2016.02); *F02M 26/70* (2016.02); *F02M 26/71* (2016.02); *F16K 11/0525* (2013.01); *F16K 11/085* (2013.01); *F01N 3/101* (2013.01); *F02M 26/22* (2016.02)

(58) Field of Classification Search
CPC ....... F02B 37/183; F02B 37/22; F02M 26/70; F02M 26/71; F02M 26/43; F02M 26/05; F02M 26/52; F02M 26/22; F16K 11/085; F16K 11/0525; F01N 3/101
USPC ....................................................... 60/605.2
See application file for complete search history.

(56) References Cited

U.S. PATENT DOCUMENTS

| 4,179,892 A | 12/1979 | Heydrich |
| 4,794,758 A | 1/1989 | Nakazawa et al. |

(Continued)

FOREIGN PATENT DOCUMENTS

| DE | 102013020448 A1 | 6/2015 |
| EP | 0377058 A1 | 7/1990 |

*Primary Examiner* — Audrey K Bradley
*Assistant Examiner* — Dapinder Singh
(74) *Attorney, Agent, or Firm* — Lorenz & Kopf, LLP

(57) ABSTRACT

A turbocharger system includes a valve assembly with an inlet, a first outlet, and a second outlet. The inlet is configured for receiving flow of an exhaust gas from an engine. The valve assembly includes a valve structure disposed within a housing. The valve structure is configured to rotate about an axis of rotation between a first position and a second position. The valve structure defines a nonlinear flow passage with an axial upstream end and radial downstream end. The valve structure, in a first position, directs exhaust gas from the inlet to the first outlet and closes off the second outlet. The valve structure, in the second position, directs exhaust gas from the inlet to the second outlet and closes off the first outlet.

20 Claims, 7 Drawing Sheets

(51) Int. Cl.
*F16K 11/085* (2006.01)
*F02M 26/71* (2016.01)
*F02M 26/43* (2016.01)
*F02M 26/52* (2016.01)
*F16K 11/052* (2006.01)
*F02M 26/22* (2016.01)

(56) References Cited

U.S. PATENT DOCUMENTS

| | | |
|---|---|---|
| 4,964,435 A | 10/1990 | Disco |
| 5,329,968 A | 7/1994 | Powell |
| 5,943,864 A | 8/1999 | Sumser et al. |
| 6,216,459 B1 | 4/2001 | Daudel et al. |
| 6,324,847 B1 | 12/2001 | Pierpont |
| 6,672,061 B2 | 1/2004 | Schmid et al. |
| 6,694,735 B2 | 2/2004 | Sumser et al. |
| 6,877,492 B1 | 4/2005 | Osterwald |
| 7,051,527 B2 | 5/2006 | Schmid et al. |
| 7,428,813 B2 | 9/2008 | Finger et al. |
| 7,513,114 B2 | 4/2009 | Sumser et al. |
| 7,562,529 B2 | 7/2009 | Kuspert et al. |
| 7,934,379 B2 | 5/2011 | Kuspert et al. |
| 8,161,747 B2 | 4/2012 | Pierpont et al. |
| 8,176,737 B2 | 5/2012 | Pierpont et al. |
| 8,196,403 B2 | 6/2012 | Hittle et al. |
| 8,312,720 B2 | 11/2012 | Kratschmer et al. |
| 8,522,547 B2 | 9/2013 | Sumser et al. |
| 8,621,863 B2 | 1/2014 | Kratschrner et al. |
| 9,593,646 B2 | 3/2017 | Laufer |
| 9,752,537 B2 | 9/2017 | Dale et al. |
| 10,590,838 B2 * | 3/2020 | Rankenberg .......... F01D 17/148 |
| 10,655,534 B2 * | 5/2020 | Zatko ..................... F02M 26/52 |
| 10,767,554 B2 * | 9/2020 | Mehne .................. F01D 25/162 |
| 2002/0166547 A1 | 11/2002 | Bailey |
| 2003/0230085 A1 | 12/2003 | Sumser et al. |
| 2005/0144945 A1 | 7/2005 | Schmid et al. |
| 2009/0120087 A1 | 5/2009 | Sumser et al. |
| 2011/0173974 A1 | 7/2011 | Grabowska |
| 2012/0222419 A1 | 9/2012 | Hittle et al. |
| 2014/0144134 A1 * | 5/2014 | Mcewan et al. |
| 2016/0131056 A1 | 5/2016 | Henry et al. |
| 2018/0023460 A1 * | 1/2018 | Mawer ..................... F02D 9/16 251/304 |

\* cited by examiner

ROTARY AXIAL VALVE

CROSS REFERENCE TO RELATED APPLICATION

This application is a continuation of U.S. patent application Ser. No. 15/889,642, filed on Feb. 6, 2018, the entire disclosure of which is incorporated herein by reference.

TECHNICAL FIELD

The present disclosure generally relates to a valve and, more particularly, relates to a rotary axial valve for a turbocharger system.

BACKGROUND

Some vehicles include a turbocharger system with one or more turbochargers. Typically, turbochargers include a turbine wheel and a compressor wheel mounted on a common shaft and carried within isolated turbine and compressor housings, respectively. The turbine wheel may be driven in rotation by exhaust gas output by the engine. This, in turn, rotates the compressor wheel for compressing air that is fed to the combustion chambers of the engine. Accordingly, the turbocharger may provide a performance boost and increased efficiency to the engine.

Exhaust gas flow through the turbocharger system may change depending on the operating conditions of the engine. For example, in lower-load conditions, exhaust gas mass flow may be relatively low. In contrast, in higher-load conditions, exhaust gas mass flow may be relatively high. Also, exhaust gas flow may be different during engine startup as compared to when the engine has been running for some time. Other operating conditions may affect exhaust gas flow as well.

Accordingly, it is desirable to provide an improved turbocharger system that regulates the flow of exhaust gas in a variety of operating conditions. For example, it is desirable to provide an improved valve assembly for a turbocharger system that effectively controls the flow of exhaust gas, wherein input forces for actuating the valve are relatively low, and wherein exhaust gas leakage through the valve assembly is relatively low. Other desirable features and characteristics of the present disclosure will become apparent from the subsequent detailed description and the appended claims, taken in conjunction with the accompanying drawings and this background discussion.

BRIEF SUMMARY

In one embodiment, a turbocharger system includes a housing with an inlet, a first outlet, and a second outlet. The inlet is configured for receiving flow of an exhaust gas from an engine. The system also includes a turbine wheel of a turbocharger that is configured to be driven in rotation by a first flow of the exhaust gas. The first flow is received from the first outlet of the housing. Also, the turbocharger system includes a second exhaust system that is configured to receive a second flow of the exhaust gas. The second flow is received from the second outlet of the housing. The turbocharger system further includes a valve structure that is disposed within the housing. The valve structure is configured to rotate about an axis of rotation between a first position and a second position. The valve structure defines a flow passage with an upstream end, a downstream end, and a nonlinear axis that extends between the upstream end and the downstream end. The upstream end is directed substantially along the axis of rotation and configured to receive the exhaust gas from the inlet. The downstream end is configured to deliver the exhaust gas to one of the first outlet and the second outlet. The valve structure, in the first position, is configured to direct the exhaust gas along the first flow from the upstream end, through the flow passage, to the downstream end and the first outlet for driving the turbine wheel. The valve structure, in the first position, is configured to substantially close off the second outlet. The valve structure, in the second position, is configured to direct the exhaust gas along the second flow from the upstream end, through the flow passage, to the downstream end and the second outlet for delivery to the second exhaust system. The valve structure, in the second position, is configured to substantially close off the first outlet.

In another embodiment, a method of operating a turbocharger system includes generating, with an engine, an exhaust gas flow directed toward an inlet of a housing. The housing has a first outlet and a second outlet. The method also includes selectively rotating, with a control system, a valve structure about an axis of rotation within the housing between a first position and a second position to regulate the exhaust gas flow through the housing. The valve structure defines a flow passage with an upstream end, a downstream end, and a nonlinear axis that extends between the upstream end and the downstream end. The upstream end is directed substantially along the axis of rotation and is configured to receive the exhaust gas from the inlet. The downstream end is configured to deliver the exhaust gas to one of the first outlet and the second outlet. The valve structure, in the first position, directs the exhaust gas flow from the upstream end, through the flow passage, to the downstream end and the first outlet for driving a turbine wheel of a turbocharger. The valve structure substantially closes off the second outlet when in the first position. The valve structure, in the second position, directs the exhaust gas flow from the upstream end, through the flow passage, to the downstream end and the second outlet for delivery to a second exhaust system. The valve structure substantially closes off the first outlet when in the second position.

In a further embodiment, a turbocharger system includes an engine configured to output a flow of exhaust gas. The turbocharger system also includes a turbocharger with a turbine wheel and an exhaust gas recirculation (EGR) system. Additionally, the turbocharger system includes a valve assembly having a valve housing defining an inlet, a first outlet, and a second outlet. The valve assembly also includes a bushing that is fixed to the valve housing. The bushing has a first portion that is received within the valve housing and a second portion that projects from an inner surface of the valve housing. The valve assembly also includes a valve structure that is disposed within the housing. The valve structure includes a body and a shaft that extends from a downstream face of the body. The shaft is received within and supported for rotation by the bushing between a first position and a second position. The body includes an upstream face that is directed along the axis of rotation and a downstream face that faces opposite the upstream face. The body includes a radial face that is directed radially with respect to the axis of rotation and that extends between the upstream face and the downstream face. The downstream face faces toward an inner surface of the valve housing. The body includes a flow passage with an upstream end in the upstream face and a downstream end in the radial face. The upstream end is configured to receive the exhaust gas from the inlet. The downstream end is configured to deliver the exhaust gas to one of the first outlet and the second outlet, and wherein the downstream face is configured to compress against the bushing and the inner surface of the valve housing under a load from the exhaust gas on the body. The body, in the first position, is configured to direct the exhaust gas from the upstream end, through the flow passage, to the downstream end and the first outlet for driving the turbine wheel. A second control surface of the radial face, in the first position, is configured to substantially close off the second outlet. The body, in the second position, is configured to direct the exhaust gas from the upstream end, through the flow passage, to the downstream end and the second outlet for delivery to the (EGR) system. A first control surface of the radial face, in the second position, is configured to substantially close off the first outlet. The downstream end is disposed circumferentially between the first control surface and the second control surface on the radial face.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
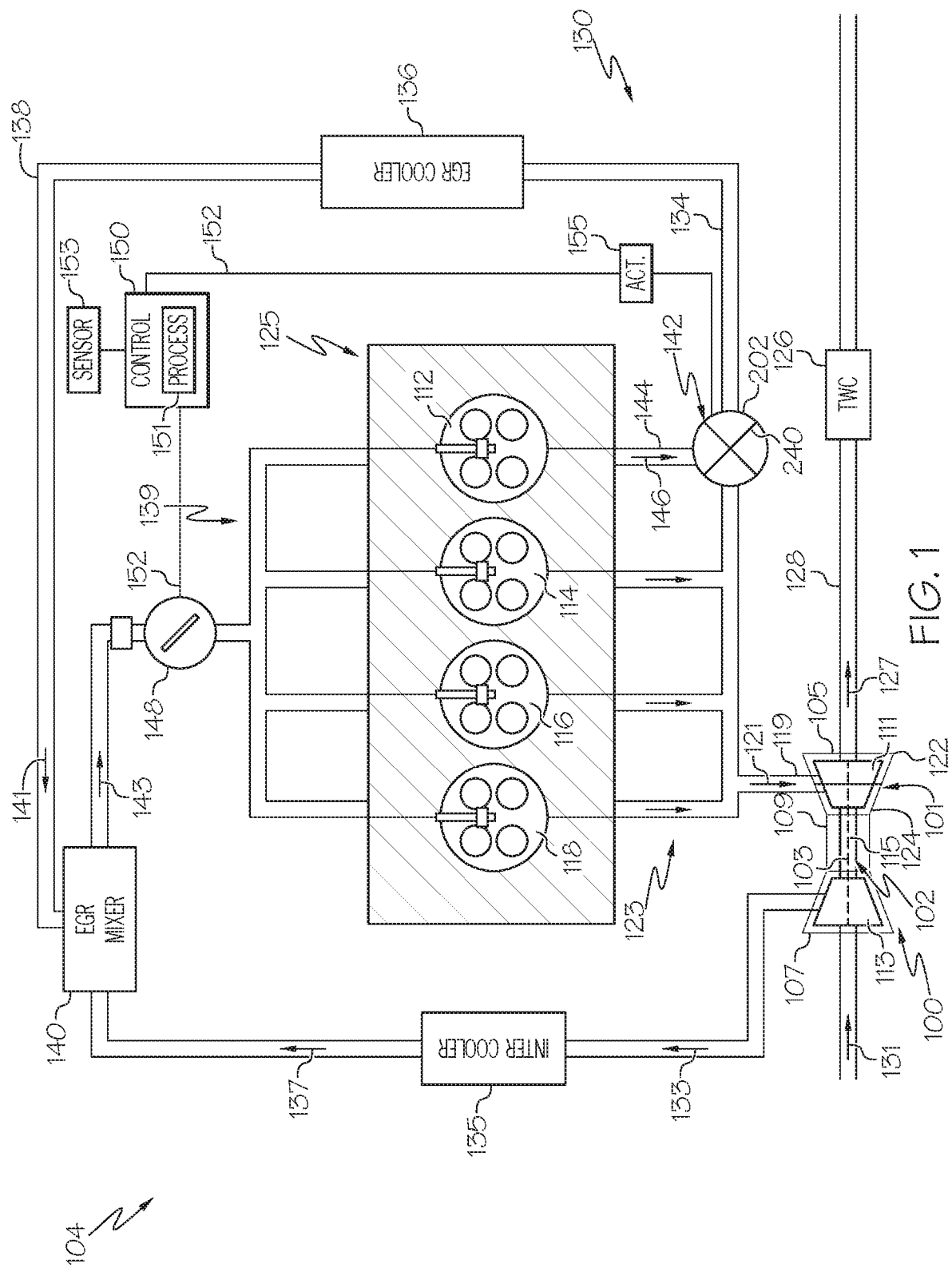
FIG. 1 is a schematic illustration of a turbocharger system configured according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbocharger system with a valve assembly that is configured to provide improved and selective control of an engine's exhaust gas flow between two or more systems or devices. In some embodiments, the valve assembly may have at least two positions. In one position, the valve assembly may direct the exhaust gas to a turbine section of a turbocharger, and in another position, the valve assembly may direct the flow to a second exhaust system (e.g., an aftertreatment system (e.g., an exhaust gas recirculation (EGR) system, etc.), a wastegate system, etc.).

The valve assembly may include a valve housing that defines an inlet and at least two outlets. The valve assembly may also include a valve structure that is supported for movement within the valve housing to regulate exhaust gas flow through the valve assembly (i.e., from the inlet to one of the outlets).

The valve structure may include a flow passage with an upstream end that is directed axially and a downstream end that is directed substantially in a radial direction. The valve structure may rotate to change the circumferential position (i.e., the rotational angle) of the downstream end. As such, the valve structure may rotate to change the exhaust gas flow between the first outlet and the second outlet of the valve housing.

In some embodiments, the valve structure may have a first position in which the valve structure directs flow from the inlet of the valve housing to the first outlet while substantially sealing off the second outlet of the valve housing. In contrast, in the second position, the valve structure may direct flow from the inlet to the second outlet while substantially sealing off the first outlet of the valve housing. In other words, opening one outlet in the valve assembly closes off the other outlet and vice versa.

Moreover, the valve assembly may be configured such that the valve structure moves under relatively low input loads. Also, loads on the valve structure from the exhaust gas may serve to "preload" the valve assembly. In other words, these loads may push the valve structure against opposing surfaces to create a seal that limits exhaust gas leakage from the valve assembly.

Furthermore, in some embodiments, the valve structure may be supported for rotation via a bushing that is fixed to the valve housing and that projects from an inner surface of the valve housing. The projecting portion of the bushing may be received within a body of the valve structure. The axial load from the exhaust gas may serve to strengthen a fluid seal between the valve structure and the bushing to reduce leakage. Also, a clearance path (defined between the body of the valve structure and the valve housing as well as between the body and the bushing) may be substantially nonlinear to reduce exhaust gas leakage from the valve assembly.

FIG. 1 is a schematic view of a turbocharger system 104 according to example embodiments of the present disclosure. The turbocharger system 104 may be included in a vehicle of a variety of types (cars, trucks, vans, or other vehicles) without departing from the scope of the present disclosure. Generally, the turbocharger system 104 may include a turbocharger 100 and an engine 125.

The engine 125 may be one of a variety of types, such as a diesel engine. The engine 125 may include a first combustion chamber 112, a second combustion chamber 114, a third combustion chamber 116, and a fourth combustion chamber 118. Each combustion chamber 112, 114, 116, 118 may produce exhaust gas that flows through respective branches of an exhaust manifold 123, which converges at an exhaust inlet pipe 119 for delivery to the turbocharger 100.

The turbocharger 100 may include a turbocharger housing 101 and a rotor 102. The rotor 102 is configured to rotate within the turbocharger housing 101 about an axis of rotation 103. The rotor 102 may be supported for rotation via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, the bearing housing 109 may contain the bearings of the rotor 102.

Additionally, the rotor 102 may include at least one turbine wheel 111, a compressor wheel 113, and a shaft 115.

The turbine wheel(s) 111 is/are located substantially within the turbine housing 105. The compressor wheel 113 is located substantially within the compressor housing 107. The shaft 115 extends along the axis of rotation 103, through the bearing housing 109, to connect the turbine wheel(s) 111 to the compressor wheel 113. Accordingly, the turbine wheel(s) 111 and the compressor wheel 113 rotate together about the axis 103.

The compressor housing 107 and compressor wheel 113 cooperate to define a compressor (i.e., compressor section, compressor stage). The compressor wheel 113 is configured to compress axially received input air (e.g., ambient air 131, or already-pressurized air from a previous-stage in a multi-stage compressor) into a pressurized air stream 133 that is ejected from the compressor toward the engine 125.

In some embodiments, the pressurized air stream 133 may be channeled through an air cooler 135 (i.e., intercooler), such as a convectively cooled charge air cooler. The air cooler 135 may be configured to dissipate heat from the pressurized air stream 133, increasing its density. The resulting cooled and pressurized output air stream 137 is channeled into an EGR mixer 140 and further downstream to the engine 125 as will be explained in more detail below.

The turbine housing 105 and the turbine wheel(s) 111 cooperate to form a turbine (i.e., turbine section, turbine stage) of the turbocharger 100. The turbine may be configured to receive a high-pressure and high-temperature exhaust gas stream 121 from the engine 125 via the exhaust inlet pipe 119.

Furthermore, in some embodiments, the turbine housing 105 may include one or more volute structures that extend circumferentially about the axis 103 and about the turbine wheel(s) 111. For example, the turbine housing 105 may include a first volute structure 122 and a second volute structure 124. The first and second volute structures 122, 124 may receive the exhaust gas stream 121 and accelerate the flow toward the turbine wheel(s) 111. Accordingly, the turbine wheel(s) 111 (and thus the rotor 102) is driven in rotation around the axis 103 by the high-pressure and high-temperature exhaust gas stream 121.

The system 104 may also include an exhaust pipe 128, which is fluidly connected downstream of the turbine housing 105. The exhaust pipe 128 may receive a lower-pressure and lower-temperature exhaust gas stream 127 and may direct the stream 127 toward an aftertreatment device 126. The aftertreatment device 126 may be one of a number of devices that treat the exhaust gas stream 127 for reducing certain substances, particulate, etc. therein. For example, the aftertreatment device 126 may be a three-way catalyst (TWC) device, a selective catalyst reduction (SCR) device, etc.

As shown, the system 104 may further include a second exhaust system 130. In some embodiments represented by FIG. 1, the second exhaust system 130 may route exhaust gas from the engine 125 and away from the turbocharger 100. The second exhaust system 130 may be one of a variety of types without departing from the scope of the present disclosure. In some embodiments, the second exhaust system 130 may be an aftertreatment system configured to treat the exhaust gas and reduce an amount of a substance therein. For example, the second exhaust system 130 may comprise an exhaust gas recirculation (EGR) system that is configured to recirculate exhaust gas back toward the engine 125. Specifically, in some embodiments, the EGR system may include a branch pipe 134, an EGR cooler 136, and EGR pipe 138, and the EGR mixer 140.

A valve assembly 142 may be operatively attached and disposed between the manifold 123 and the branch pipe 134. Specifically, in some embodiments, the valve assembly 142 may be operatively attached and disposed between a first branch 144 of the manifold 123 and the branch pipe 134. As will be discussed in detail, the valve assembly 142 may be configured for regulating a first chamber exhaust flow 146 from the first combustion chamber 112. In some situations, the valve assembly 142 may direct the first chamber exhaust flow 146 to the branch pipe 134 (and, thus, to the EGR cooler 136, the EGR pipe 138, and the EGR mixer 140). In other situations, the valve assembly 142 may direct the first chamber exhaust flow 146 to downstream components of the manifold 123 to combine with the exhaust gas flow from the other combustion chambers in the pipe 119. The valve assembly 142 will be discussed more detail below according to example embodiments.

The EGR mixer 140 may combine the air stream 137 and any EGR stream 141 into an intake stream 143. The intake stream 143 may be fed to an intake manifold 139 of the engine 125. A throttle 148 may regulate the mass flow of the intake stream 143 into the intake manifold 139.

The operation of the system 104 may be controlled by a control system 150. The control system 150 may include a computerized processor 151 and may be integrated within the engine control unit (ECU) of the vehicle. The control system 150 may connect to the remainder of the system via one or more communication connections 152. The control system 150 may be configured for controlling the valve assembly 142, the throttle 148, as well as other features of the system 104 as will be discussed in greater detail below.

The control system 150 may include a sensor system having one or more sensors 153. The sensor(s) 153 may include a speed sensor for measuring engine speed and/or throttle position in some embodiments. Accordingly, the sensor(s) 153 may detect the current load on the engine 125 and/or the current fuel consumption needs of the engine 125. Also, the sensor(s) 153 may include flow sensors for measuring airflow to and/or from the compressor section of the turbocharger 100. Likewise, the sensor(s) 153 may detect characteristics of exhaust flow to and/or from the turbine section of the turbocharger 100.

The control system 150 may additionally include one or more actuators 155. In some embodiments, the actuators 155 may be an electric motor, but it will be appreciated that the actuator 155 could be another type without departing scope of the present disclosure. The processor 151 may generate control commands and send them to the actuator 155 for moving the valve assembly 142 between various positions that will be discussed in detail below.

It will be appreciated that these features of the turbocharger system 104 may vary from the illustrated embodiments. For example, the turbine wheel(s) 111 may be configured as a radial, axial, or mixed turbine wheel without departing from the scope of the present disclosure. Also, although a single inlet pipe 119 is shown for simplicity in FIG. 1, it will be appreciated that there may be multiple inlet pipes 119 (e.g., separate inlet pipes 119 configured to individually deliver exhaust to the first or second volute structure 122, 124). In addition, the EGR exhaust system 130 may be a different exhaust system (e.g., a wastegate assembly, etc.) without departing from the scope of the present disclosure. Moreover, although only one of the combustion chambers (here, the first combustion chamber 112) is fluidly connected to the valve assembly 142, it will be appreciated that multiple combustion chambers may be fluidly connected to the valve assembly 142 without departing from the scope of the present application.

Referring now to FIGS. 1-5, the valve assembly 142 will be discussed in detail according to example embodiments. The valve assembly 142 may be configured with one fluid inlet and two fluid outlets. In some embodiments, the inlet may be fluidly connected to the first branch 144 to receive the first chamber exhaust flow 146, one outlet may be fluidly connected to the exhaust inlet pipe 119 to feed the turbine of the turbocharger 100, and the other outlet may be fluidly connected to the branch pipe 134 to feed the EGR exhaust system 130. In some embodiments, the valve assembly 142 may be configured to regulate flow, for example, from the first combustion chamber 112. More specifically, in a first position represented in FIG. 2, the valve assembly 142 may direct the first chamber exhaust flow 146 to the branch pipe 134 and to the EGR exhaust system 130 to be recirculated back to the engine 125. In a second position represented in FIG. 3, the valve assembly 142 may direct the first chamber exhaust flow 146 to the exhaust inlet pipe 119 and to the turbine housing 105 of the turbocharger 100 for driving the turbine wheel 111.

As will be discussed below, the valve assembly 142 includes various features that provide a number of advantages over conventional valve assemblies. For example, input loads for actuating the valve assembly 142 may be relatively low due to its configuration. Also, the load on the valve assembly from the exhaust gas may "pre-load" the valve assembly to thereby reduce leakage. As the loads increase, for example, the pre-loading increases to further reduce leakage. Other features may reduce leakage as well.

Generally, the valve assembly 142 may include a valve housing 202 that is hollow and that includes interior surfaces that define at least one flow passage for exhaust gas from the first combustion chamber 112. The valve assembly 142 may direct the exhaust gas along a first path in a first configuration, and the valve assembly 142 may direct the exhaust gas along a different second path in a second configuration.

Figure 2:
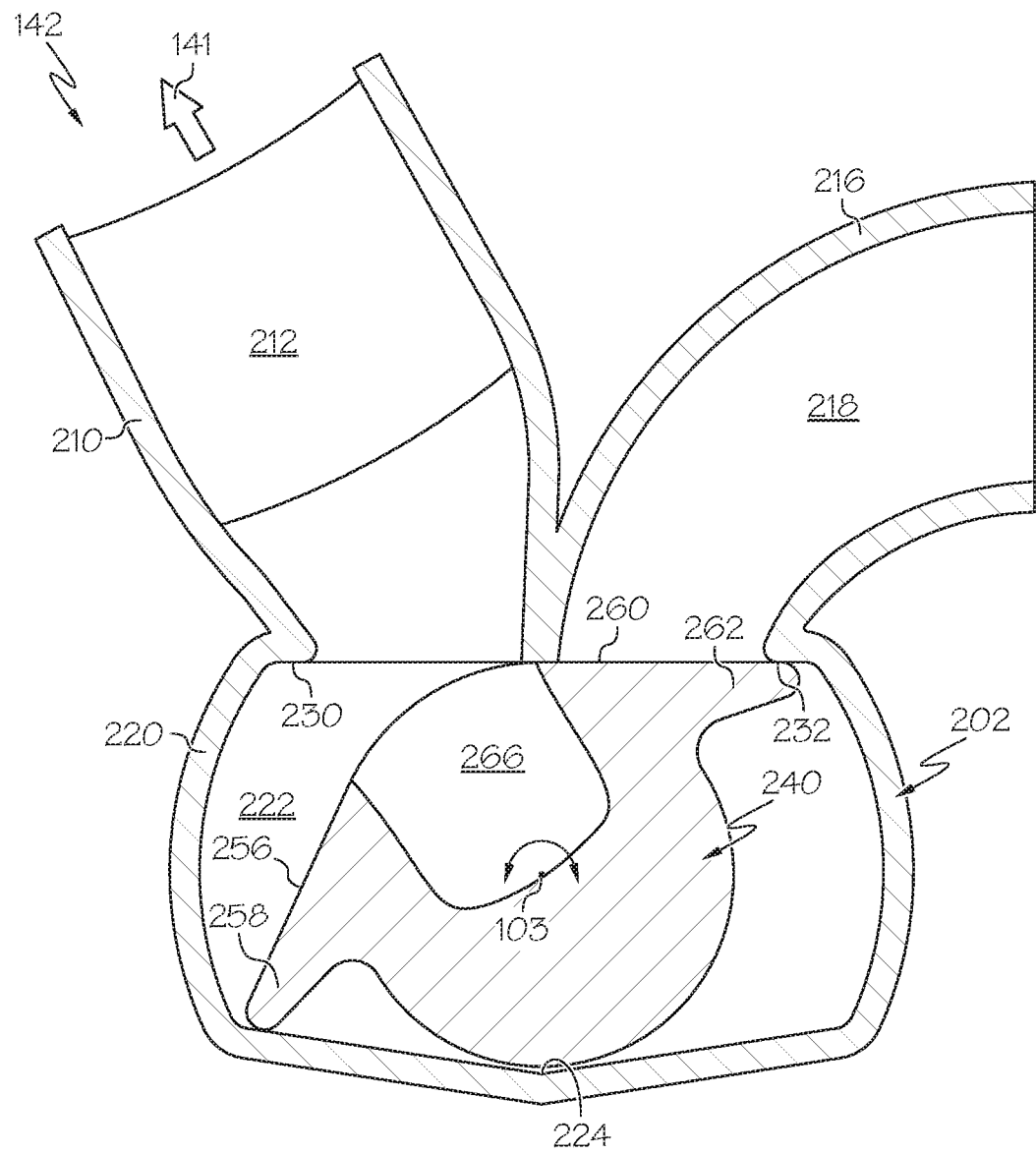
FIG. 2 is an axial section view of a valve assembly of FIG. 1 in a first position.
Figure 3:
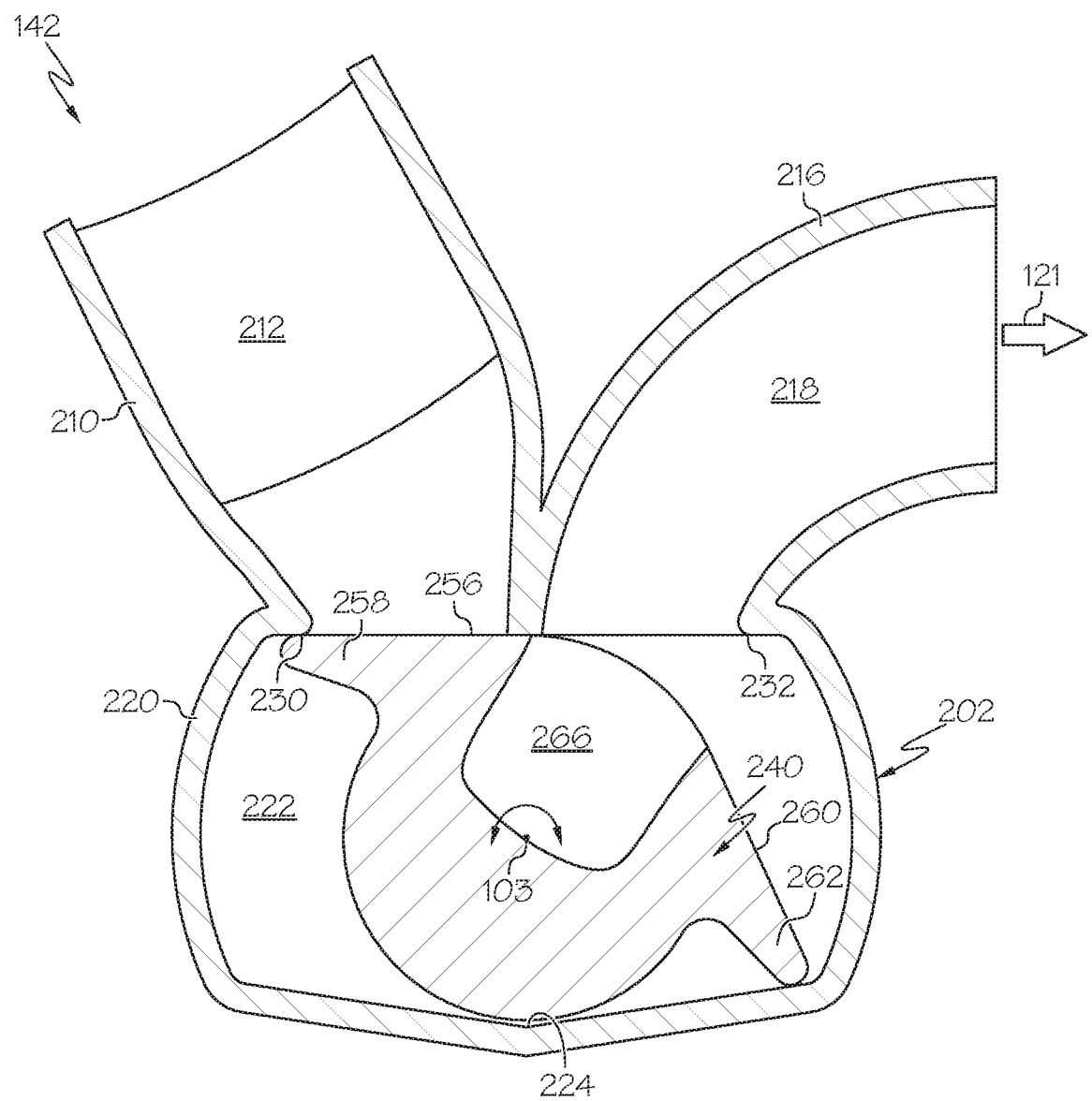
FIG. 3 is an axial section view of a valve assembly of FIG. 1 in a second position.
Figure 4:
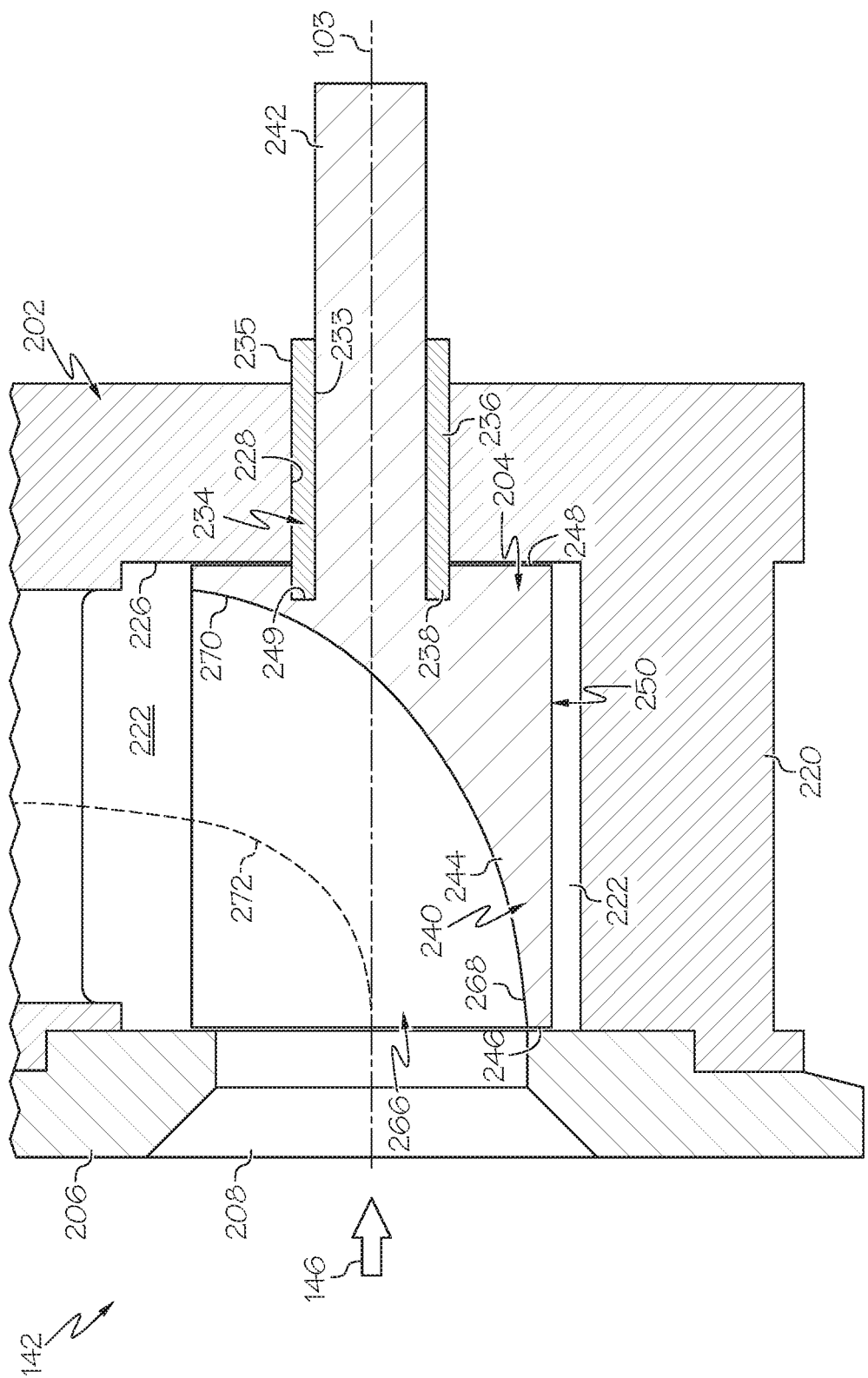
FIG. 4 is a longitudinal section view of the valve assembly of FIG. 2.

The valve housing 202 may include an inlet portion 206 that defines an inlet passage 208 (FIG. 4). The inlet passage 208 may extend along the axis of rotation 103. The inlet passage 208 may have any suitable cross sectional shape (taken perpendicular to the axis 103). For example, the inlet passage 208 may have a circular cross sectional shape, an ovate cross sectional shape, a polygonal cross sectional shape, or otherwise. The valve housing 202 may also include a first outlet portion 210 with a first outlet passage 212 and a second outlet portion 216 with a second outlet passage 218 (FIGS. 2 and 3). The first and second outlet passages 212, 218 may extend transversely away from the axis 103. For example, the first and/or second outlet passages 212, 218 may extend away from the axis 103 at an angle between eighty degrees (80°) and one hundred degrees (100°). The cross sectional shapes of the first and second outlet passages 212, 218 may be circular, ovate, polygonal, or otherwise. Furthermore, the valve housing 202 may include an intermediate portion 220 with an intermediate passage 222 (FIGS. 2-4). The intermediate passage 222 may have a polygonal cross section (taken perpendicular to the axis 103) as shown in FIGS. 2 and 3. The intermediate passage 222 may be fluidly connected to the inlet passage 208, the first outlet passage 212 and the second outlet passage 218. Also, the intermediate passage 222 may include a groove 224 (FIGS. 2 and 3) that extends along the axis 103. The groove 224 may be disposed on a bottom portion of the valve housing 202, whereas the first and second outlet portions 210, 216 may be disposed on the top of the valve housing 202. In other words, the groove 224 may be disposed on an opposite side of the axis 103 from the first and second outlet portions 210, 216.

The valve housing 202 may further include a plurality of fluid junctions. For example, the valve housing 202 may include a first seat 230 where the intermediate passage 222 is fluidly connected to the first outlet passage 212. The valve housing 202 may further include a second seat 232 where the intermediate passage 222 is fluidly connected to the second outlet passage 218. As shown in FIG. 4, the first seat 230 and the second seat 232 may be disposed proximate an upstream-facing inner surface 226 of the valve housing 202. The inner surface 226 may include an aperture 228. The aperture 228 may be centered on and may extend along the axis 103. In some embodiments, the aperture 228 may be a circular through-hole that extends through the inner surface 226 and the intermediate portion 220 of the valve housing 202.

In some embodiments, the inlet portion 206, the first outlet portion 210, the second outlet portion 216, and the intermediate portion 220 may be integrally connected such that the valve housing 202 is unitary, one-piece, and monolithic. In other embodiments, the valve housing 202 may be assembled from two or more separate pieces. Also, in some embodiments, the valve housing 202 may be attached on the outside of the turbine housing 105. Moreover, in some embodiments, at least part of the valve housing 202 may be integrally attached to at least part of the turbine housing 105 such that those attached parts are unitary and monolithic. In other embodiments, the valve housing 202 may be spaced apart from the turbine housing 105.

As shown in FIG. 4, the valve assembly 142 may further include a bushing 234. The bushing 234 may be cylindrical and hollow in some embodiments. The bushing 234 may have an inner diameter surface 233 and an outer diameter surface 235. The bushing 234 may also include a first portion 236, which is received in the aperture 228 of the valve housing 202. The outer diameter surface 235 may be fixedly attached to the inner surface of the aperture 228 to fix the bushing 234 to the valve housing 202. For example, the bushing 234 may be press-fit via a pressing process into the aperture 228. Also, the bushing 234 may include a second portion 238, which is spaced apart from the first portion 236 along the axis 103 of the bushing 234. The second portion 238 may project from the inner surface 226 of the valve housing 202 and into the intermediate passage 222.

Additionally, the valve assembly 142 may include a valve structure 240. The valve structure 240 may be disposed within the valve housing 202, within the intermediate passage 222. The valve structure 240 may be supported for movement within the housing 202 to regulate exhaust gas flow through the valve assembly 142. For example, in some embodiments, the vale structure 240 may be supported for rotational movement about the axis 103.

Figure 5:
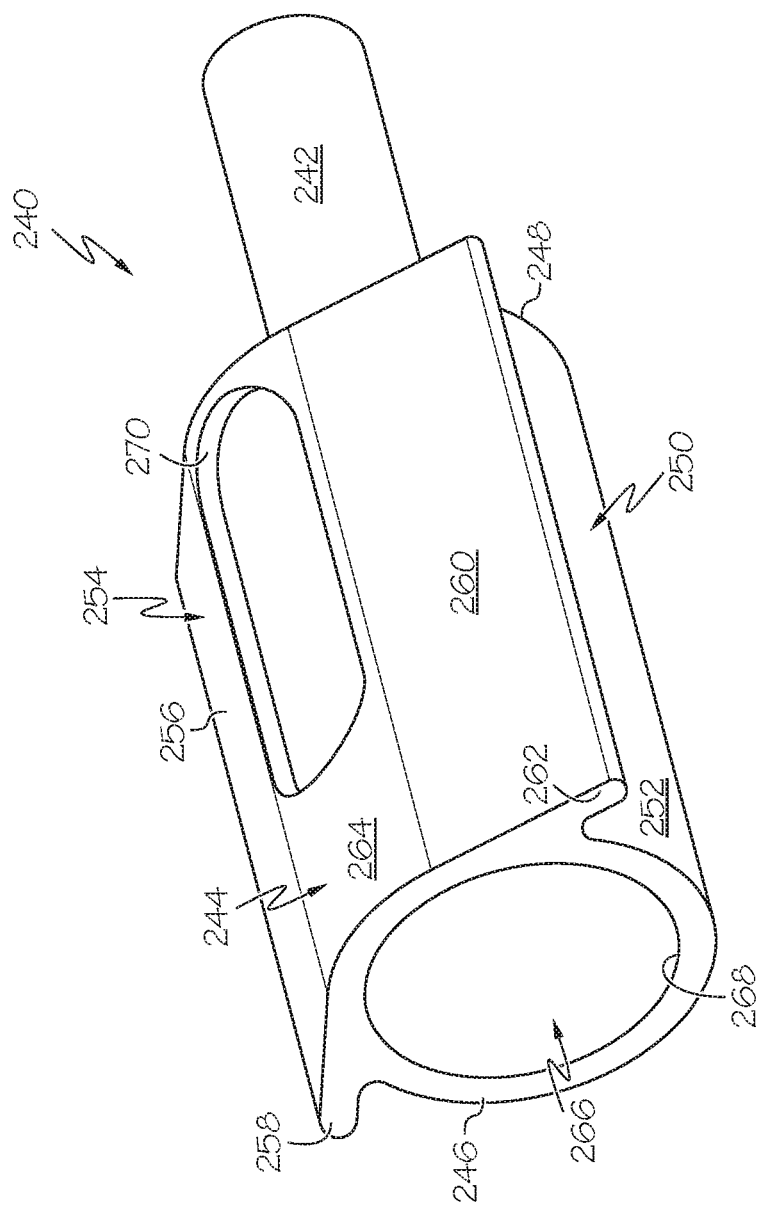
FIG. 5 is a perspective view of a valve structure of the valve assembly of FIG. 2.

As shown in FIG. 5, the valve structure 240 may generally include a shaft 242 and a body 244. The shaft 242 may be cylindrical and may project from the body 244. The shaft 242 may be received within the bushing 234 as shown in FIG. 4. The shaft 242 may be supported for rotational movement by the inner diameter surface 233 of the bushing 234.

The body 244 may be a solid (non-hollow) body. The body 244 may include an upstream face 246, a downstream face 248, and a radial face 250 that extends between the upstream and downstream faces 246, 248. The shaft 242 may be fixedly connected to the downstream face 248 and may project therefrom to be received in the inner diameter surface 233 of the bushing 234.

The upstream face 246 may be directed along the axis of rotation 103 in an upstream direction toward the inlet passage 208. The downstream face 248 may be directed along the axis of rotation 103 in a downstream direction (opposite that of the upstream face 246). Also, the downstream face 248 may be directed toward and may oppose the inner surface 226 of the valve housing 202. As shown in FIG. 4, the downstream face 248 may be in close proximity to the inner surface 226. Also, in some embodiments, both the downstream face 248 and the inner surface 226 may be substantially flat and substantially parallel to each other.

The downstream face 248 may further include a recess 249. The recess 249 may be rounded and annular. The recess 249 may continuously encircle the shaft 242. The recess 249 may receive the second portion 238 of the bushing 234. It will be appreciated that this feature is optional; accordingly, in some embodiments, the bushing 234 may encircle the shaft 242 without extending into the body 244 of the valve structure 240.

It will be appreciated that there may be a relatively small amount of clearance between the valve structure 240 and the bushing 234 to enable rotation of the valve structure 240 about the axis 103. Specifically, there may be clearance between the bushing 234 and the inner surfaces of the recess 249 and between the shaft 242 and the inner diameter surface 233 of the bushing 234. Despite this small amount of clearance, the valve assembly 142 may include certain features that reduces, limits, and/or prevents the amount of leakage from the valve assembly 142 as will be discussed in greater detail below.

The radial face 250 of the valve structure 240 may be directed transverse (e.g., substantially radially) with respect to the axis of rotation 103. The radial face 250 may also extend about the axis of rotation 103. The radial face 250 may include a rounded portion 252 and a control portion 254, which may be on opposite sides of the axis 103. The rounded portion 252 may curve smoothly and gradually in the circumferential direction about the axis 103. The rounded portion 252 may also be received within the groove 224 of the valve housing 202 (FIGS. 2 and 3). The control portion 254 of the radial face 250 may include a first control surface 256 and a second control surface 260. As shown in FIG. 5, the first control surface 256 may be rectangular and may be substantially flat and planar. The first control surface 256 may also project tangentially to define a first wing 258 of the control portion 254 of the valve structure 240. Similarly, the second control surface 260 may be rectangular and may be substantially flat and planar. The second control surface 260 may project tangentially to define a second wing 262. As shown in FIGS. 2 and 3, the first control surface 256 and the second control surface 260 may be spaced apart at angle with respect to the axis 103 (i.e., spaced apart in the circumferential direction). The radial face 250 may further include an intermediate area 264 that is disposed between the first and second control surfaces 256, 260 in the circumferential direction. The intermediate area 264 may curve gradually about a radius with respect to the axis 103 and between the first and second control surfaces 256, 260.

The valve structure 240 may additionally include a flow passage 266 for directing exhaust gas flow through the valve structure 240. The flow passage 266 may include an upstream end 268 that is defined in the upstream face 246 and that is directed along the axis 103. In some embodiments, the upstream end 268 may be substantially circular as shown in FIG. 5. The upstream end 268 may be aligned with and may be in fluid communication with the inlet passage 208 of the valve housing 202. The flow passage 266 may further include a downstream end 270 that is disposed in the intermediate area 264 of the radial face 250. As such, the downstream end 270 of the flow passage 266 may be disposed between the first and second control surfaces 256, 260 in the circumferential direction. The downstream end 270 may be directed transverse with respect to the axis 103 (i.e., in a direction that intersects the axis 103). For example, the downstream end 270 may be directed at an angle between eighty degrees (80°) and one hundred degrees (100°) relative to the axis 103. The downstream end 270 may be elongate (e.g., ovate) in shape in some embodiments as shown in FIG. 5.

As shown in FIG. 4, the flow passage 266 may have a nonlinear axis 272 extending between the upstream end 268 and the downstream end 270. In some embodiments, the flow passage 266 may curve smoothly and gradually through the valve structure 240 from the upstream end 268 to the downstream end 270.

As will be discussed in detail, the upstream end 268 of the flow passage 266 may receive the exhaust gas flow 146 from the first combustion chamber 112. The flow passage 266 may direct this flow transversely (e.g., radially) along the axis 272 toward the downstream end 270. The downstream end 270 may deliver this flow to either the first outlet passage 212 or the second outlet passage 218, depending on the position of the valve structure 240 within the valve housing 202. In some embodiments, the valve structure 240 may be supported for rotational movement within the bushing 234 between a first position (FIG. 2) and a second position (FIG. 3).

In the first position, the downstream end 270 of the flow passage 266 may be directed toward (aligned with) and fluidly connected to the outlet passage 212. Meanwhile, the control surface 260 may seal against the seat 232 and substantially seal off the outlet passage 218. Additionally, the wing 258 may abut against an inner surface of the valve housing 202 to subdivide the intermediate passage 222 of the valve housing 202 and to provide a fluid boundary.

Accordingly, with the valve structure 240 in the first position, the inlet passage 208 may receive the exhaust gas flow 146 from the combustion chamber 112. The upstream end 268 of the flow passage 266 may receive this flow, and the valve structure 240 may direct this flow through the flow passage 266, to the downstream end 270, and into the outlet passage 212. The exhaust gas stream 141 may exit the valve assembly 142 and flow toward the EGR cooler 136 and, eventually toward the engine 125. Meanwhile, the valve structure 240, in the first position, may close off the outlet passage 218 and prevent flow from the combustion chamber 112 to the turbocharger 100.

In contrast, in the second position (FIG. 3), the downstream end 270 of the flow passage 266 may be directed toward and fluidly connected to the outlet passage 218. Meanwhile, the control surface 256 may seal against the seat 230 and substantially seal off the outlet passage 212. Additionally, the wing 262 may abut against an inner surface of the valve housing 202 to subdivide the intermediate passage 222 of the valve housing 202 and to provide a fluid boundary.

Accordingly, with the valve structure 240 in the second position, the inlet passage 208 may receive the exhaust gas flow 146 from the combustion chamber 112. The upstream end 268 of the flow passage 266 may receive this flow, and the valve structure 240 may direct this flow through the flow passage 266 to the downstream end 270 and into the outlet passage 218. The stream 121 may exit the valve assembly 142 and flow toward at least one volute structure 122, 124 of the turbine housing 105 of the turbocharger 100. Meanwhile, the valve structure 240, in the second position, may close off the outlet passage 212 and prevent flow from the combustion chamber 112 to the EGR system 130.

As mentioned above, the control system 150 (FIG. 1) may be configured for controlling movement of the valve structure 240 between the first and seconds positions. Specifically, in some embodiments, the sensor 153 may detect a condition (e.g., current engine speed, mass flow of the exhaust flow 146 from the combustion chamber 112, position of the throttle 148, or other condition). Accordingly, the sensor 153 may detect, for example, the fuel consumption requirements of the engine 125.

The sensor 153 may generate and the processor 151 may receive a signal from the sensor 153 that correlates to the condition detected by the sensor 153. The processor 151 may rely on programmed logic to determine which position the valve structure 240 should be in based on the input from the sensor 153. The processor 151 may generate and send control commands to the actuator 155 for moving the valve structure 240 to the determined position.

For example, at low engine speeds, low engine loads, etc., the processor 151 may determine that the valve structure 240 should be in the first position (FIG. 2) such that the exhaust gas flow 146 from the first combustion chamber 112 is delivered to the EGR system 130 and is recirculated back to the engine 125. In contrast, at high engine speeds, high engine loads, etc. the processor 151 may determine that the valve structure 240 should be in the second position (FIG. 3) such that the exhaust gas flow 146 from the first combustion chamber 112 is delivered to the turbine housing 105 of the turbocharger 100.

Thus, the valve assembly 142 is configured to direct exhaust to one outlet while substantially sealing off the other outlet. Accordingly, the valve assembly 142 may provide efficient regulation of the exhaust gas flow.

Furthermore, it will be appreciated that the exhaust gas flow through the flow passage 266 may push the body 244 of the valve structure 240 axially. The downstream face 248 of the body 244 may, therefore, push and compress against the axial end of the bushing 234 due to the axial loads from the exhaust gas flow. The downstream face 248 may also push and compress against the inner surface 226 of the valve housing 202 due to these axial loads. Accordingly, exhaust gas leakage between the downstream face 248 and the inner surface 226 may be limited.

In addition, in some embodiments, the bushing 234 extends axially into the body 244 of the valve structure 240 to provide certain advantages. As explained above, there may be a small amount of clearance between the downstream face 248 of the valve structure 240 and the inner surface 226 of the valve housing 202 as well as between the valve structure 240 and the bushing 234. However, as shown in FIG. 4, leakage along this path is unlikely because it is circuitous and labyrinthine. Specifically, the path from inside the valve assembly 142 to outside along this clearance extends: a) from the intermediate passage 222; b) radially inward in the area between the downstream face 248 and the inner surface 226; c) then axially upstream between the outer diameter surface 235 of the bushing 234 and the opposing inner surface of the recess 249; d) then radially inward between the end of the bushing 234 and the opposing inner surface of the recess 249; and then e) axially downstream between the inner diameter surface 233 of the bushing 234 and the outer diameter of the shaft 242. This circuitous route may substantially prevent leakage from the valve assembly 142.

Figure 6:
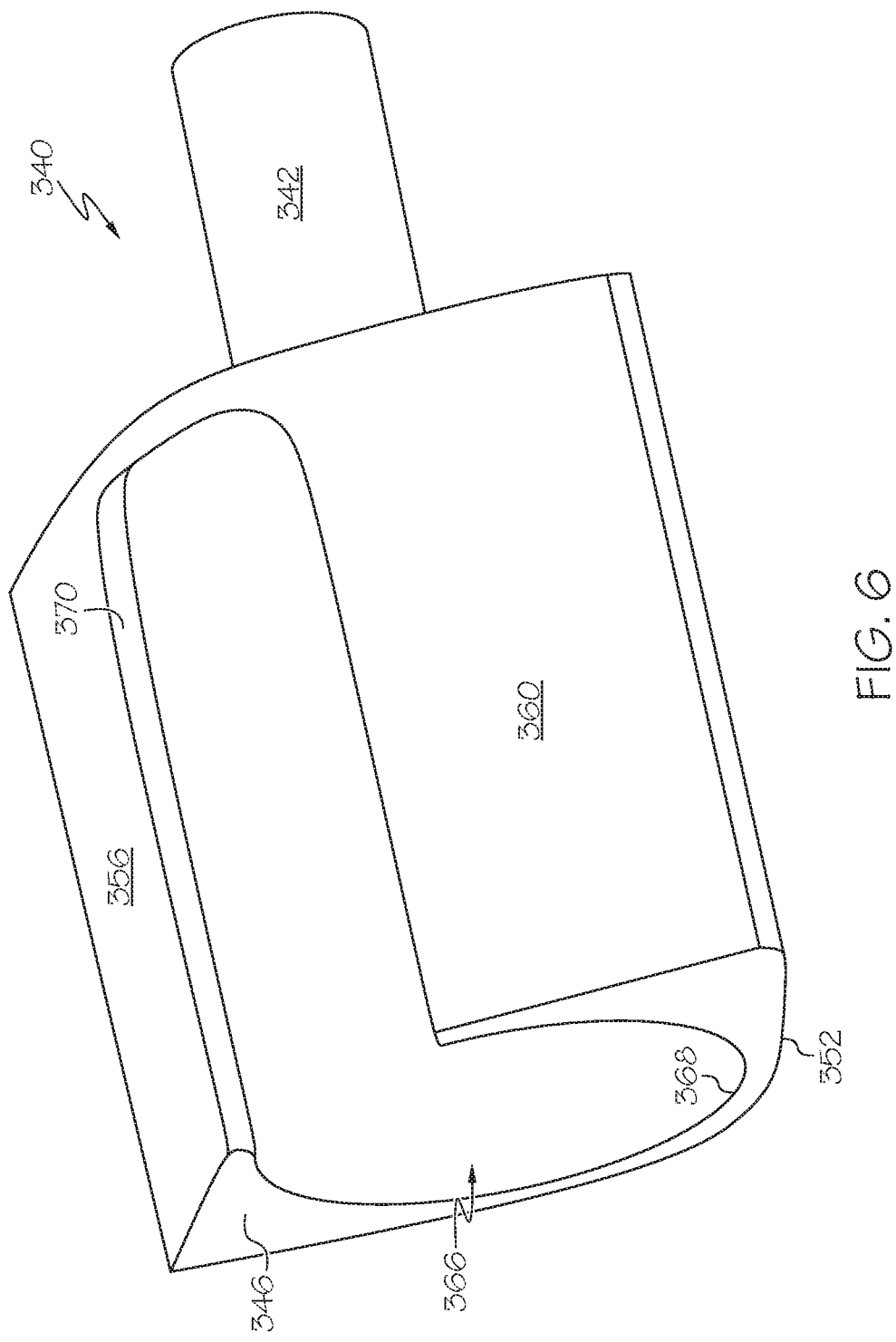
FIG. 6 is a perspective view of the valve structure according to additional example embodiments of the present disclosure.

Referring now to FIG. 6, the valve structure 340 is illustrated according to additional embodiments of the present disclosure. Components that correspond to those of the embodiment of FIGS. 2-5 are indicated with corresponding reference numbers increased by 100.

As shown, the valve structure 340 may include the shaft 342 and the body 360. The shaft 342 may be substantially similar to the embodiments of FIGS. 2-5. However, the body 360 may have a somewhat diamond-shaped cross section. The rounded portion 352 of the body 360 may have a larger radius than the above embodiments such that one circumferential end of the rounded portion 352 terminates at the first control surface 356 and the opposite circumferential end terminates at the second control surface 360.

Furthermore, the flow passage 366 may be configured differently than the embodiments of FIGS. 2-5. The flow passage 366 may be configured as an open channel such that the upstream end 368 is open to the downstream end 370 proximate the upstream face 346.

Figure 7:
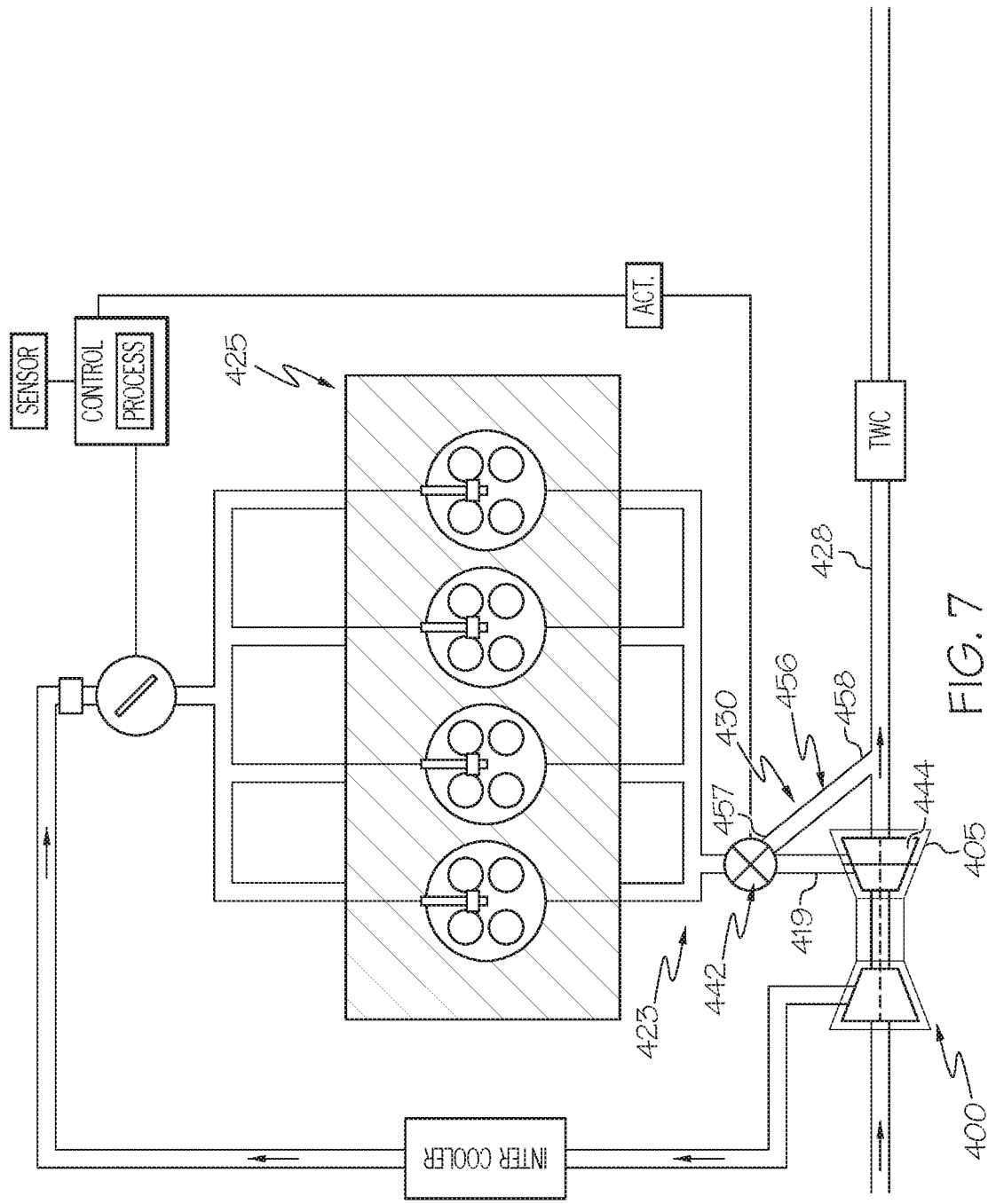
FIG. 7 is a schematic view of the turbocharger system according to additional example embodiments of the present disclosure.

Referring now to FIG. 7, the turbocharger system 404 is illustrated according to additional embodiments of the present disclosure. Components that correspond to those of the embodiment of FIG. 1 are indicated with corresponding reference numbers increased by 300.

As shown, the turbocharger system 404 may include the turbocharger 400 as well as the second exhaust system 430. The second exhaust system 430 may be a wastegate system with a wastegate structure 456 with an upstream end 457 and a downstream end 458. The wastegate structure 456 may be a hollow tube, and the downstream end 458 may be fluidly connected to the exhaust pipe 428.

The system 404 may further include the valve assembly 442. The valve assembly 442 may be substantially similar to those discussed above. However, the valve assembly 442 may be fluidly connected to the exhaust manifold 423 and may receive exhaust therefrom. Accordingly, the valve assembly 442 may receive exhaust from multiple (e.g., all) combustion chambers of the engine 425. The valve assembly 442 may also be operably connected to the inlet pipe 419 of the turbine housing 405 of the turbocharger 400. Furthermore, the valve assembly 442 may be operably connected to the upstream end 457 of the wastegate structure 456.

Accordingly, in the first position of the valve assembly 442, exhaust gas from the engine 425 may be directed to the turbine wheel 444 of the turbocharger 400. In contrast, in the second position, exhaust from the engine 425 may bypass the turbocharger 400 and, instead, may be directed through the wastegate structure 456 to the exhaust pipe 428.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A valve system comprising:
a housing defining an inlet, a first outlet, and a second outlet, the inlet configured for receiving flow of a fluid;
a turbine wheel configured to be driven in rotation by a first flow of the fluid, the first flow received from the first outlet of the housing;
a second flow path that is configured to receive a second flow of the fluid, the second flow received from the second outlet of the housing; and
a valve structure that is disposed within the housing;
the valve structure including a body configured to rotate about an axis of rotation between at least a first position and a second position, the body having at least one surface that projects tangentially with respect to the axis of rotation;
the valve structure defining a flow passage with an upstream end, a downstream end, and a nonlinear axis that extends between the upstream end and the downstream end, the upstream end directed substantially along the axis of rotation and configured to receive the fluid from the inlet, the downstream end configured to deliver the fluid to at least one of the first outlet and the second outlet;
the valve structure, in the first position, configured to direct the fluid along the first flow from the upstream end, through the flow passage, to the downstream end and the first outlet for driving the turbine wheel;
the at least one surface of the body, with the valve structure in the first position, configured to close off the second outlet;
the valve structure, in the second position, configured to direct the fluid along the second flow from the upstream end, through the flow passage, to the downstream end and the second outlet for delivery to the second flow path;
the body, with the valve structure in the second position, configured to obstruct the first outlet.

2. The turbocharger system of claim 1, wherein the valve structure includes the body and a shaft that extends from a downstream face of the body;
wherein the shaft is supported for rotation about the axis of rotation;
wherein the upstream end is included in an upstream face of the body, the upstream face facing opposite the downstream face; and
wherein the downstream face is configured to compress against the housing under a load from the fluid on the body.

3. The turbocharger system of claim 1, wherein the valve structure includes the body and a shaft that extends from the body;
wherein the shaft is supported for rotation between the first position and the second position;
wherein the body, in the first position, is configured to close off the second outlet; and
wherein the body, in the second position, is configured to close off the first outlet.

4. The turbocharger system of claim 3, further comprising a bushing with a first portion and a second portion that are spaced apart along the axis of rotation;
wherein the first portion receives the shaft and is received by the valve housing; and
wherein the second portion is received within the body of the valve structure.

5. The turbocharger system of claim 3, wherein the at least one surface includes a first surface configured to substantially close off the second outlet when the valve structure is in the first position;
wherein the at least one surface includes a second surface that projects tangentially with respect to the axis of rotation, the second surface configured to close off the first outlet when the valve structure is in the second position; and
wherein the downstream end of the flow passage is disposed between the first surface and the second surface.

6. The turbocharger system of claim 5, wherein the body has a radial face extending about the axis of rotation;
wherein the first surface and the second surface define respective portions of the radial face.

7. The turbocharger system of claim 5, wherein at least one of the first surface and the second surface is a planar surface.

8. The turbocharger system of claim 3, wherein the body includes an upstream face, a downstream face, and a radial face that extends between the upstream face and the downstream face;
wherein the upstream end of the flow passage is defined in the upstream face;
wherein the downstream end of the flow passage is defined in the radial face; and
wherein the downstream face opposes an inner surface of the housing.

9. The turbocharger system of claim 1, further comprising an actuator configured to actuate the valve structure between the first position and the second position.

10. The turbocharger system of claim 9, further comprising a sensor configured to detect a condition;
further comprising a control system with a processor;
wherein the processor is configured to receive an input from the sensor, the input corresponding to the detected condition; and
wherein the processor is configured to generate a control command for the actuator to actuate the valve structure between the first position and the second position based, at least partly, on the input received by the processor.

11. The turbocharger system of claim 1, wherein the turbine wheel is supported for rotation within a turbine housing;
wherein the turbine housing includes a plurality of volute structures; and
wherein at least one of the volute structures is configured to receive the first flow of the fluid from the first outlet.

12. The turbocharger system of claim 1, further comprising an internal combustion engine with a plurality of combustion chambers; and
wherein only one of the plurality of combustion chambers is fluidly connected to the inlet of the housing.

13. The turbocharger system of claim 1, wherein the second flow path is one of an exhaust aftertreatment system and a wastegate assembly.

14. The turbocharger system of claim 1, wherein the valve structure includes the body and a shaft that extends from a downstream face of the body;
wherein the shaft is received within a bushing that is attached to the housing, wherein the bushing supports rotation of the shaft about the axis of rotation, and wherein the bushing includes an axial end;

wherein the upstream end is included in an upstream face of the body, the upstream face facing opposite the downstream face; and wherein the downstream face is configured to compress against the axial end of the bushing under a load from the fluid on the body.

15. A method of operating a turbocharger system comprising:

generating, with an engine, an exhaust gas flow directed toward an inlet of a housing, the housing having a first outlet and a second outlet;

selectively rotating, with a control system, a valve structure about an axis of rotation within the housing between a first position and a second position to regulate the exhaust gas flow through the housing, the valve structure including a body with at least one surface that projects tangentially with respect to the axis of rotation, the valve structure defining a flow passage with an upstream end, a downstream end, and a nonlinear axis that extends between the upstream end and the downstream end, the upstream end directed along the axis of rotation and configured to receive the exhaust gas from the inlet, the downstream end configured to deliver the exhaust gas to at least one of the first outlet and the second outlet;

the valve structure, in the first position, directing the exhaust gas flow from the upstream end, through the flow passage, to the downstream end and the first outlet for driving a turbine wheel of a turbocharger, the at least one surface closing off the second outlet when the valve structure is in the first position; and the valve structure, in the second position, directing the exhaust gas flow from the upstream end, through the flow passage, to the downstream end and the second outlet for delivery to a second exhaust system, the body obstructing the first outlet when the valve structure is in the second position.

16. The method of claim 15, further comprising detecting, with a sensor, a condition;

further comprising receiving, by the control system, an input corresponding to the detected condition; and wherein selectively rotating the valve structure includes generating, with a processor of the control system, a control command for rotating the valve structure based at least partly on the input.

17. The method of claim 16, wherein detecting the condition includes detecting at least one of a current load on the engine and a current fuel consumption requirement of the engine.

18. The method of claim 15, wherein the valve structure includes the body and a shaft that is supported for rotation by a bushing that is fixed to the housing;

the bushing having a first portion and a second portion that are spaced apart along the axis of rotation, wherein the second portion is received within the body of the valve structure; and wherein rotating the valve structure includes rotating the valve structure relative to the bushing.

19. The method of claim 15, wherein the valve structure includes the body with an upstream face, a downstream face, and a radial face that extends between the upstream face and the downstream face;

wherein the upstream end of the flow passage is defined in the upstream face;

wherein the downstream end of the flow passage is defined in the radial face; and wherein the downstream face opposes an inner surface of the housing.

20. The method of claim 15, wherein the at least one surface includes a first surface that projects tangentially with respect to the axis of rotation and a second surface that projects tangentially with respect to the axis of rotation;

wherein selectively rotating the valve structure includes the first surface closing off the second outlet when the valve structure is in the first position; and wherein selectively rotating valve structure includes the second surface closing off the first outlet when the valve structure is in the second position.

* * * * *